United States Patent Office 3,316,114
Patented Apr. 25, 1967

3,316,114
PROCESS FOR COLORING ORGANIC PRODUCTS WITH PIGMENT DYESTUFFS
Armin Caliezi, deceased, late of Basel, Switzerland, by Elsa Caliezi, administratrix, Basel, Switzerland, assignor to Ciba Limited, Basel, Switzerland, a firm of Switzerland
No Drawing. Continuation of application Ser. No. 131,012, Aug. 11, 1961. This application Apr. 13, 1966, Ser. No. 543,490
Claims priority, application Switzerland, Dec. 16, 1957, 53,799/57
9 Claims. (Cl. 106—163)

This is a continuation of application Ser. No. 131,012, filed Aug. 11, 1961 and now abandoned, which is a continuation-in-part of application Ser. No. 778,631, filed Dec. 8, 1958, by Armin Caliezi, and now abandoned.

Organic pigment dyestuffs which are to be used for coloring organic products, for example, lacquers, plastic masses, for example, polyvinyl chloride, or printing colors or artificial silk, have to fulfill a very wide variety of requirements. The most important of these are, extreme insolubility in organic solvents, a high fastness to light even in weak colorations, good fastness to migration and also heat resistance.

Although the range of blue and green dyestuffs among the phthalocyanines and chlorinated phthalocyanines and among indanthrone pigments include dyestuffs which fulfill all these requirements to a considerable extent, there are no pigments yielding red tints, especially in the range of vat dyestuffs, which fulfill all the aforesaid requirements.

The present invention is based on the observation that the compound of the formula

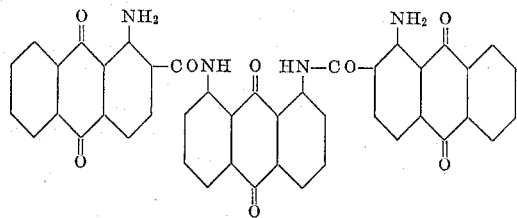

is excellently suitable for coloring high molecular organic products such as plastic substances, such as rubber, casein, polymerization resins, such as polyvinyl chloride and its co-polymers, polyvinyl acetals, polyethylene, polypropylene, polystyrene and mixed polymers of the latter with polyesters obtained from unsaturated dicarboxylic acids and diols, polyacrylates and their co-polymers, silicone and silicone resins. The pigments to be employed according to the present method are moreover suitable for producing colored condensation resins, in particular aminoplasts, for example urea formaldehyde or melamine formaldehyde resins, polyaddition resins, such as epoxy or polyurethane resins or alkyd resins, and also for manufacturing colored lacquers containing one or more of said resins in an organic solvent, or aqueous emulsions containing one or more of said resins or precondensates, if required in the presence of organic solvents, for example an oil-in-water or a water-in-oil emulsion. Such emulsions are suitable especially for impregnating or printing on textiles or other sheet-like structures, such as paper, leather or fabrics consisting of glass fibers, if necessary with subsequent hardening by heat treatment. The pigment to be employed according to the present process may also be employed for producing spin-dyed fibers, for example of viscose, cellulose esters or polyacrylonitrile. Moreover it can be used with advantage in the manufacture of cosmetic preparations.

The pigment to be employed according to the present process, which is obtained in a physically usable form during synthesis, is advantageously brought into a finely divided state before application, for example by grinding the crude pigment in dry or watery-moist form with or without the addition of an organic solvent and/or of a salt which can be washed out.

The pigment to be employed according to the present process may be used either in pure form as so-called toner or in the form of preparations in which the pigment is present in a finely divided state, advantageously with a particle diameter of not more than 3μ. Such preparations, which may also contain the usual additions, for example dispersing agents or binders, can be prepared in manner known per se by intensive mechanical treatment, for instance on roll mills or in suitable kneading apparatus. In this connection, the dispersing medium permitting the intensive working up is selected according to the purpose in view, for example to produce aqueous dispersible preparations sulfite waste liquor or dinaphthylmethanedisulfonic acid salts will be employed, and, for the production of acetate silk spinning preparations, acetyl cellulose mixed with a little solvent.

Owing to the favorable physical form in which the product according to the present invention is obtained and owing to its chemical inertness and good temperature stability, it can normally be distributed readily in substances or preparations of said kind, this being done advantageously at a time when said substances or preparations do not yet have their final form. The steps required for shaping, such as spinning, moulding, hardening, casting, cementing and the like, can then also be carried out readily in the presence of the present pigments without any possible chemical reactions of the substrate, such as further polymerisations, condensations or polyadditions, being impeded.

The following examples illustrate the invention, the parts signifying, unless otherwise stated, parts by weight, the percentages being by weight, while the temperatures are given in degrees centigrade.

*Example 1*

5 parts of the dyestuff of the formula

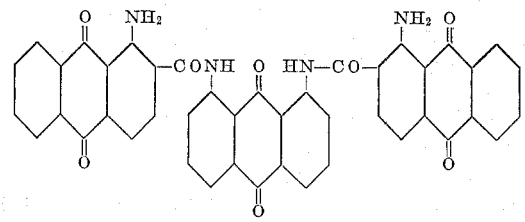

are mixed with 95 parts of dioctyl phthalate and ground in a ball mill until the dyestuff particles are smaller than 3μ.

0.8 part of this dioctyl phthalate paste is mixed with 13 parts of polyvinyl chloride, 7 parts of titanium dioxide and thereupon rolled out for 5 minutes on a two-roll mill at 140° C.

A red coloring of good light and migration fastness is obtained.

The dyestuff of the Formula I is a known compound and be obtained by condensing 1-mol of 1,8-diaminoanthraquinone with 2 mols. of 1-nitroanthraquinone-2-carboxylic acid chloride and subsequent reduction of the two nitro groups.

*Example 2*

40 parts of a nitrocellulose lacquer, 2.375 parts of titanium dioxide and 0.125 part of the dyestuff according to Example 1 are ground for 16 hours in a rod mill. The lacquer obtained is spread out in a thin layer on an aluminium foil. A coat of red lacquer of very good fastness properties is obtained.

Example 3

A mixture consisting of 25 parts of the dyestuff according to Example 1, 25 parts of acetyl cellulose (54.5% combined acetic acid), 100 parts of sodium chloride and 50 parts of diacetonealcohol are treated in a kneader while being cooled until the desired degree of fineness of the pigment is attained. 25 parts of water are then added and kneading is carried out until a fine-grained mass has been produced. This is placed on a suction filter and the sodium chloride and the diacetone alcohol are washed out completely with water. The product is dried in a vacuum cupboard at 85° C. and ground in a hammer mill.

1.33 parts of the pigment preparation obtained are added to an acetate silk spinning mass consisting of 100 parts of acetyl cellulose and 376 parts of acetone. Stirring is carried out for 3 hours, this being sufficient for the complete distribution of the dyestuff. The filament obtained from this mass by the usual method after the drying process exhibits a red coloration which has very good fastness properties.

Example 4

0.25 part of the dyestuff according to Example 1 is ground for 24 hours in a rod mill with 40 parts of an alkyd melamine stoving lacquer containing 50% of solids and 4.75 parts of titanium dioxide. The lacquer obtained is painted in a thin layer on an aluminium foil and baked for one hour at 120° C. A coat of red lacquer having good light fastness is obtained.

Example 5

4.8 parts of the dyestuff according to Example 1 are ground with 4.8 parts of the sodium salt of 1:1'-dinaphthylmethane-2:2'-disulfonic acid and 22.1 parts of water in one of the known colloid mills until all the dyestuff particles are smaller than $1\mu$. The pigment suspension obtained in this way has a pigment content of about 15%.

If this aqueous suspension is added to viscose spinning solution, a red-colored cellulose filament of very good fastness properties is obtained by the conventional spinning process.

Example 6

A dyebath is prepared containing, to 1.000 parts of water, 15 parts of a mixed-polymer latex consisting of 85.8 parts of isobutyl acrylate, 9.6 parts of acrylonitrile and 4.6 parts of acrylic acid, 15 parts of a 70% emulsion of a methylol melamine allyl ether emulsified with Turkey red oil and modified with soybean fatty acid, 50 parts of a water-soluble methyl ether of a urea formaldehyde condensation product containing, condensed in, more than 2 mols of formaldehyde per mol of urea, 5 parts of the pigment suspension obtained according to Example 5, paragraph 1, and 20 parts of formic acid of 10% strength.

Cotton fabric is introduced dry at room temperature into the above dyebath, squeezed out on a padder with a liquid absorption of 65–80%, dried normally, if necessary under tension (clamps or needle frame) and finally hardened at 145–150° C. for 5 minutes.

A red coloring is obtained having good fastness properties.

Example 7

100 parts of the pigment dyestuff employed in Example 1 are mixed with 40 parts of the addition product of 15 mols of ethylene oxide and 1 mol of di-tert-butyl-paracresol and 20 parts of water in a kneading apparatus to form a viscous, homogeneous paste and thoroughly kneaded until the dyestuff agglomerates produced during drying have been dispersed uniformly finely. The mass is carefully diluted with 90 parts of water under constant further kneading and finally homogenized by means of a funnel mill or another suitable apparatus until a pliable homogeneous paste is produced which contains practically exclusively dispersed primary dyestuff particles having a diameter of $3\mu$ at the most. 250 parts of a red paste containing 40% of pigment are obtained.

60 parts of this paste are mixed with 850 parts of an oil-in-water emulsion containing 55% of petroleum hydrocarbons, 5% of a styrene-butadiene emulsion mixed polymer and 3.5% of a solution consisting of about 75% by weight of water-insoluble melamine formaldehyde primary condensate modified with n-butanol and about 25% by weight of n-butanol as separate inner phase and 36.5% of an aqueous solution containing 7.5 parts by weight of an ion free emulsifier prepared according to patent application No. 603,164, filed Aug. 9, 1956 by Hans U. Gassmann, Example 3, to 92.5 parts by weight of water as outer phase, 80 parts of water and 10 parts of ammonium nitrate, that is 1.000 parts in all, to form a homogeneous, pliable paste.

This paste may be printed on to fabrics made of natural or regenerated cellulose or of synthetic fibers of the most diverse types by means of rollers or screens in the usual manner. After drying at normal or elevated temperature and subsequent heat treatment for some minutes at 120–150° C. red printing effects having excellent rubbing, washing and light fastness are obtained.

Example 8

A mixture consisting of 50 parts of the pigment dyestuff according to Example 1, 100 parts of Staybelite Ester 10 (glycerine ester of hydrated colorphonium), 200 parts of sodium chloride and 18 parts of diacetone alcohol are treated in a kneader under cooling until the desired degree of fineness of the pigment is obtained. The sodium chloride and the diacetone alcohol are then removed from the kneading mass by introducing water having a temperature of 80° C. The kneading mass itself is preserved. The salt-free and solvent-free kneading product is completely dried by heating the kneader with steam and pulverized in the kneader after cooling.

The preparation may be used, for example, for coloring lacquers. To this end, the preparation is advantageously mixed into a paste with a little toluene and the paste obtained is mixed together with the lacquer.

Example 9

150 parts of the dry pigment according to Example 1 are ground together with 300 parts of a casein solution of 20% strength, 40 parts of a dispersing agent and 250 parts of distilled water in a suitable apparatus until the major part of the pigment particles has a size of less than $1\mu$. The pigment paste obtained is mixed up with 50 parts of a wax emulsion of 30% strength and another 200 parts of a casein solution of 20% strength and in this way a homogeneous pigment paste of 15% strength is obtained. 50 parts of this pigment preparation of 15% strength are well mixed with 100 parts of a casein solution of 20% strength, 5 parts of sodium sulforicinoleate, 50 parts of a 10% egg albumin solution and 870 parts of distilled water.

This pigment dispersion, which is ready for use, is applied once or twice to pre-dyed chrome grain leather by means of a plush board or hairbrush. Then follows the levelling application with the same pigment solution by spraying on at a pressure of 4 to 5 atmospheres. Thereupon, a casein solution of 20% strength is applied in the same manner, briefly dried and hardened with a formaldehyde solution of 8–10% strength. By mechanical glazing and hydraulic pressing of the leather surface at 60–80° C. and a pressure of 150–200 atmospheres, the pigment application is sealed off. The dye has good light fastness and excellent fastness to wet rubbing and high transparency.

Both during the glazing and during the hot pressing, no color change can be observed.

Doubling of the quantity of pigment used in the finishing solution effects a deepening of the color without shifting the color shade.

The above described red pigment paste can be mixed with suitable similarly composed pigment preparations. In this way, for example, in combination with white pigments red even pastel tones having excellent light and migration fastness are obtained.

*Example 10*

For the so-called ironing preparation, binders based on polyacrylic acid ester inter alia may be employed without any trouble in addition to the red pigment paste; in this way softer and more flexible covering layers are obtained than with the sole use of casein binders.

In order to produce an ironing preparation, the pigment solution may be composed as follows:

50 parts of a red pigment paste of 15% strength, 100 parts of casein solution of 20% strength, 25 parts of sodium sulforicinoleate, 150 parts of a 40% emulsion of a polyacrylic acid ester and 675 parts of distilled water. This thinly liquid pigment suspension is first applied to the generally buffed leather to be dyed by means of a plush board. After drying and hydraulic pressing at 60° C. and a pressure of 100–150 atmospheres, the levelling application is made with the same pigment solution by spraying on at a pressure of 4–5 atmospheres.

Finally, a glazing coat is applied to the dyed leather which consists of 150 parts of a casein solution of 20% strength which is thereafter fixed by spraying over with a formaldehyde solution of 8–10% strength. After thorough drying, the leather surface is once more pressed hydraulically (75–80° C., 200 atmospheres pressure).

The dye is of excellent fastness to wet rubbing and migration fast. In addition to the good light fastness, the high transparency, vividness and natural appearance are especially worth mentioning.

What is claimed is:

1. High molecular organic materials selected from the group consisting of cellulose, cellulose-esters, casein, vinyl-polymers, aminoplasts, and alkyd resins having incorporated therein, as pigment, in finely divided form a dyestuff of the formula

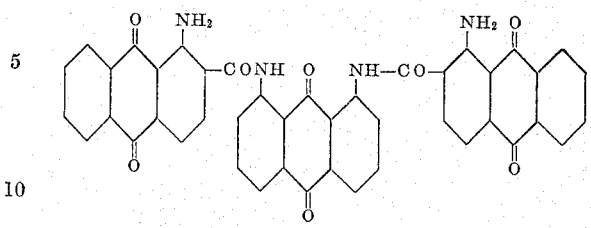

2. Cellulose having incorporated therein in finely divided form the dyestuff defined in claim 1.

3. Acetyl cellulose having incorporated therein in finely divided form the dyestuff defined in claim 1.

4. Nitro cellulose having incorporated therein in finely divided form the dyestuff defined in claim 1.

5. Polyvinylchloride having incorporated therein in finely divided form the dyestuff defined in claim 1.

6. A melamine formaldehyde resin having incorporated therein in finely divided form the dyestuff defined in claim 1.

7. A polyacrylate resin having incorporated therein in finely divided form the dyestuff defined in claim 1.

8. A urea formaldehyde resin having incorporated therein in finely divided form the dyestuff defined in 9. An alkyd resin having incorporated therein in finely divided form the dyestuff defined in claim 1.

References Cited by the Examiner

UNITED STATES PATENTS

| 1,539,689 | 5/1925 | Nawiasky et al. | 260—368 |
| 2,470,001 | 5/1949 | Stober | 260—41 |
| 2,589,974 | 3/1952 | Solonen et al. | |
| 2,870,172 | 1/1959 | Schoenauer | 260—377 |

FOREIGN PATENTS

| 225,232 | 6/1908 | Germany. |
| 950,188 | 10/1956 | Germany. |

OTHER REFERENCES

Melliand: vol. 33 (1952), pp. 63–68.

MORRIS LIEBMAN, *Primary Examiner.*

A. LIEBERMAN, *Assistant Examiner.*